US009831946B2

(12) United States Patent
Zhou et al.

(10) Patent No.: US 9,831,946 B2
(45) Date of Patent: Nov. 28, 2017

(54) OPTICAL TRANSMITTER AND TRANSMISSION METHOD, AND OPTICAL RECEIVER AND RECEIPTION METHOD

(71) Applicant: Huawei Technologies Co., Ltd., Shenzhen (CN)

(72) Inventors: Xiaoping Zhou, Shenzhen (CN); Jing Hu, Shenzhen (CN); Yue Wen, Shenzhen (CN); Lei Wang, Shenzhen (CN); Xu Pan, Shenzhen (CN); Chengzhi Xu, Wuhan (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

(21) Appl. No.: 15/198,676

(22) Filed: Jun. 30, 2016

(65) Prior Publication Data

US 2016/0315698 A1    Oct. 27, 2016

Related U.S. Application Data

(63) Continuation of application No. PCT/CN2013/091207, filed on Dec. 31, 2013.

(51) Int. Cl.
*H04B 10/08* (2006.01)
*H04B 10/077* (2013.01)
(Continued)

(52) U.S. Cl.
CPC ...... *H04B 10/0773* (2013.01); *H04J 14/0204* (2013.01); *H04J 14/0212* (2013.01);
(Continued)

(58) Field of Classification Search
CPC .............. H04B 10/0773; H04J 14/0204; H04J 14/0212; H04J 14/0223; H04J 14/0227;
(Continued)

(56) References Cited

U.S. PATENT DOCUMENTS 6,243,180 B1 * 6/2001 Kanterakis ........... G02B 6/4215
                                                        398/86
6,262,820 B1   7/2001 Al-Salameh
(Continued)

FOREIGN PATENT DOCUMENTS

CN        1502183 A    6/2004
CN        1936630 A    3/2007
(Continued)

OTHER PUBLICATIONS

Urban, P.J., et al., "Transmission of 10 Gb/s per Wavelength in a Hybrid WDM/TDM Access Network Providing Bandwidth on-demand," IEEE, Transparent Optical Networks, ICTON 2009, Tu.C5.6, Jun. 28, 2009, 3 pages.
(Continued)

*Primary Examiner* — Hibret Woldekidan
(74) *Attorney, Agent, or Firm* — Slater Matsil, LLP

(57) ABSTRACT

The present invention discloses: when a first laser in N lasers is switched to a second idle laser in M lasers, a wavelength of a wavelength-selective optical element to which the first laser is coupled is adjusted from a first wavelength to a second wavelength, and the second wavelength is different from the N wavelengths. Similarly, when a first optical receiver in N optical receivers is switched to a second idle optical receiver in M optical receivers, a wavelength of a wavelength-selective optical element to which the first optical receiver is coupled is adjusted from a first wavelength to a second wavelength, and the second wavelength is different from the N wavelengths.

17 Claims, 11 Drawing Sheets

(51) Int. Cl.
*H04J 14/02* (2006.01)
*H04Q 11/00* (2006.01)

(52) U.S. Cl.
CPC ...... *H04J 14/0223* (2013.01); *H04J 14/0227* (2013.01); *H04J 14/0282* (2013.01); *H04J 14/0295* (2013.01); *H04Q 11/0067* (2013.01); *H04J 14/0297* (2013.01); *H04Q 2011/0016* (2013.01); *H04Q 2011/0081* (2013.01)

(58) Field of Classification Search
CPC ............... H04J 14/0282; H04J 14/0295; H04J 14/0297; H04J 14/0291; H04J 14/0294; H04J 14/0287; H04Q 11/0067; H04Q 11/0005; H04Q 2011/0016; H04Q 2011/0081
USPC .... 398/1–5, 19, 12, 7, 23, 24, 66–68, 70–72
See application file for complete search history.

(56) References Cited

U.S. PATENT DOCUMENTS

| | | | |
|---|---|---|---|
| 6,333,800 B1* | 12/2001 | Suemura | H04J 14/02 398/9 |
| 6,400,477 B1* | 6/2002 | Wellbrook | H04J 14/0295 398/45 |
| 6,614,953 B2 | 9/2003 | Strasser et al. | |
| 7,336,901 B1 | 2/2008 | Soulliere | |
| 8,103,162 B2* | 1/2012 | Duan | H04B 1/74 398/5 |
| 8,606,009 B2 | 12/2013 | Duan et al. | |
| 8,606,099 B2* | 12/2013 | Duan | H04B 10/032 398/2 |
| 9,326,049 B2* | 4/2016 | Yonenaga | H04B 10/506 |
| 2002/0071149 A1 | 6/2002 | Xu et al. | |
| 2003/0215231 A1 | 11/2003 | Weston-Dawkes et al. | |
| 2005/0207753 A1 | 9/2005 | Touma | |
| 2006/0045520 A1 | 3/2006 | Nakano et al. | |
| 2006/0056842 A1 | 3/2006 | Li et al. | |
| 2006/0171717 A1 | 8/2006 | Kikuchi | |
| 2007/0025729 A1 | 2/2007 | Barnard | |
| 2010/0183294 A1 | 7/2010 | Villarruel et al. | |
| 2010/0278526 A1* | 11/2010 | Duan | H04B 1/74 398/5 |
| 2011/0069968 A1* | 3/2011 | Tanaka | G02B 6/29362 398/140 |
| 2011/0097076 A1* | 4/2011 | Geng | H04L 7/041 398/1 |
| 2012/0057654 A1* | 3/2012 | Morris | H04L 27/2624 375/297 |
| 2012/0087658 A1 | 4/2012 | Jander | |
| 2012/0170925 A1 | 7/2012 | Liu et al. | |
| 2015/0098704 A1* | 4/2015 | Gao | H04J 14/0246 398/68 |
| 2016/0094308 A1* | 3/2016 | Liboiron-Ladouceur | H04J 14/04 398/44 |
| 2017/0033863 A1* | 2/2017 | Zhou | H04B 10/071 |
| 2017/0171647 A1* | 6/2017 | Gao | H04Q 11/0005 |
| 2017/0207876 A1* | 7/2017 | Gao | H04J 14/0232 |

FOREIGN PATENT DOCUMENTS

| | | |
|---|---|---|
| CN | 1945991 A | 4/2007 |
| CN | 101527610 A | 9/2009 |
| WO | 02075997 A1 | 9/2002 |

OTHER PUBLICATIONS

WU, M.C., et al., "Optical MEMS for Lightwave Communication," Journal of Lightwave Technology, vol. 24, No. 12, Dec. 2006, pp. 4433-4454.

* cited by examiner

OPTICAL TRANSMITTER AND TRANSMISSION METHOD, AND OPTICAL RECEIVER AND RECEPTION METHOD

CROSS-REFERENCE TO RELATED APPLICATIONS

This application is a continuation of International Application No. PCT/CN2013/091207, filed on Dec. 31, 2013 which is hereby incorporated by reference in its entirety

TECHNICAL FIELD

The present invention relates to the field of communications technologies, and in particular, to an optical transmitter and a transmission method, an optical receiver and a reception method, an optical line terminal, and a system

BACKGROUND

With the development of communications technologies, owing to advantages such as high bandwidth, good scalability, use of fewer feeder fibers, and a wide coverage area, a PON (PON) system has been widely applied in the broadband access field.

As shown in FIG. 1A, a PON system generally includes: an OLT (optical line terminal), an ONU (optical network unit)/ONT (optical network terminal), and an ODN (optical distribution network), where the ODN includes a splitter (a passive optical splitter), a feeder fiber, and a distribution fiber.

In a transmission process, the PON system uses a single-fiber bidirectional transmission mechanism to transmit two waves that are in opposite directions and have different wavelengths by using one fiber, where each wave carries a digital signal in one direction. In order to separate multiple users' signals in incoming and outgoing directions on a same fiber, the PON system uses the following two multiplexing technologies to transmit a digital signal: in a downlink transmission direction, refer to FIG. 1B; in an uplink transmission direction, refer to FIG. 1C.

With the development of communications technologies, in order to improve bandwidth, a TWDM (time/wavelength division multiplexing) PON system extended on a basis of the PON system emerges as the times require, specifically as shown in FIG. 1D. TWDM is an abbreviation of TDM (time division multiplexing) and WDM (wavelength division multiplexing). The TWDM-PON system and the PON system are the same in that an entire ODN structure remains unchanged, and a main difference is that a quantity of wavelength types corresponding to uplink and downlink light increases from one to more than two.

A process of transmitting a digital signal in a TWDM-PON system (an example in which a quantity of wavelength types corresponding to light increases from one to four is used) is as follows:

In a downlink transmission direction: Light corresponding to four different wavelengths is emitted by four lasers of an OLT respectively, enters a feeder fiber after passing through a multiplexer, and then arrives at an ONU. An optical receiver of the ONU only selects and receives light corresponding to one of the wavelengths, and therefore, a tunable filter needs to be disposed before the optical receiver. Because light corresponding to one of four wavelengths needs to be selected, four different filters may be prepared for different ONUs; or a tunable filter may be selected, and is configured for different wavelengths according to an actual need, thereby reducing a type of used filters.

In an uplink transmission direction: Any ONU may also emit light corresponding to one wavelength of four different wavelengths. In addition, the ONU may select four different lasers; or may use one laser, and adjust the laser to a specific wavelength according to a requirement, thereby reducing an ONU type. In uplink, light separately corresponding to the four different wavelengths arrives at a demultiplexer of an OLT after entering an ODN. The light separately corresponding to the four different wavelengths is split by the demultiplexer, and then enters different optical receivers.

In an actual application, in a TWDM-PON system, in order to reduce a size of an OLT module, reduce total power consumption, and improve port density of a line card, all lasers and multiplexers are integrated by using a photonic integration technology (including monolithic integration and hybrid integration) to form a miniaturized integrated optical transmitter, or all optical receivers and demultiplexers are integrated to form a miniaturized optical receiver. However, the foregoing optical transmitter or optical receiver has the following problem: When one laser of the optical transmitter is faulty, the entire optical transmitter needs to be replaced to ensure system performance. Similarly, if any optical receiver of the optical receiver is faulty, the entire optical receiver also needs to be replaced. Therefore, an integrated module in the TWDM-PON system has relatively low stability and relatively high operation costs.

In order to resolve the foregoing problem, in the prior art, some protection paths are added besides a path that works normally. An optical transmitter is used as an example. As shown in FIG. 1E, paths 1 to N are used for lasers working normally, where the lasers emit light of different wavelengths, and all of the emitted light is combined by using an optical multiplexer. 1 to M are used for lasers emitting light for protection. The light emitted from the paths 1 to N and the light emitted from the paths 1 to M for protection are combined by using a light combination device and are output from a common port at a right side. When the paths 1 to N work normally, the protection paths 1 to M are in a shutdown state, and output of the entire device is output of the light emitted from the paths 1 to N. When one path of the paths 1 to N is faulty, one path of the protection paths 1 to M is enabled to emit light. A wavelength of a signal and information on the path are completely consistent with light emitted from the faulty path. If multiple paths are faulty, multiple protection paths are enabled.

In the optical transmitter in the foregoing technical solution, multiple lasers configured to emit protective light need to be disposed, and therefore, complexity is relatively high. In addition, a light combination device used by the optical transmitter brings an extra loss, and all paths that work normally endure an extra power loss brought by the light combination device no matter whether a protection path works, lowering output optical power output optical power efficiency of an entire module.

SUMMARY

Embodiments of the present invention provide an optical transmitter and a transmission method, and an optical receiver and a reception method, so as to resolve a problem in the prior art that an integrated module in a passive optical network system has an excessive large extra power loss and relatively low output optical power output optical power efficiency.

Specific technical solutions provided in the embodiments of the present invention are as follows:

According to a first aspect, an optical transmitter is provided, where the optical transmitter includes M lasers and M wavelength-selective optical elements, wherein the M lasers are coupled to M input ends of the M wavelength-selective optical elements, the M lasers correspond to the M wavelength-selective optical elements in a one-to-one manner, where M output ends of the M wavelength-selective optical elements are coupled as one channel. The M lasers include N lasers that are in a working state, and N<M. The N lasers correspond to N different wavelengths. When a first laser in the N lasers is switched to a second idle laser in the M lasers, a wavelength of a wavelength-selective optical element to which the first laser is coupled is adjusted from a first wavelength to a second wavelength, and the second wavelength is different from the N wavelengths. Both M and N are integers greater than or equal to 1.

With reference to the first aspect, in a first possible implementation manner, a wavelength of a wavelength-selective optical element to which the second laser is coupled is set as the first wavelength.

With reference to the first aspect or the first possible implementation manner of the first aspect, in a second possible implementation manner, the wavelength-selective element is a thin film filter, and the M thin film filters are coupled as one channel by using a reflector.

With reference to the first possible implementation manner of the first aspect, in a third possible implementation manner, the wavelength-selective element is a microring resonator, and the M microring resonators are coupled as one channel by using an optical waveguide.

With reference to the first aspect or any possible implementation manner of the first aspect, in a fourth possible implementation manner, the optical transmitter further includes a control logic configured to control the first laser in the N lasers to switch to the second idle laser in the M lasers.

In this solution, when a laser that is of an optical transmitter and that is in a working state is faulty, a laser in an idle state is activated. In addition, a wavelength of an optical element to which the faulty laser is coupled is changed, so that the wavelength of the optical element is not equal to a wavelength of light emitted by a laser in the working state. Compared with a light combination device (for example, a Splitter) used in the prior art, in this technical solution, a power loss is lower. Therefore, according to this solution, a power loss can be further reduced and output optical power efficiency can be further improved.

According to a second aspect, an optical receiver is provided, where the optical receiver includes: M optical receivers and M wavelength-selective optical elements, wherein the M optical receivers are coupled to M output ends of the M wavelength-selective optical elements, the M optical receivers correspond to the M wavelength-selective optical elements in a one-to-one manner. Input ends of the M wavelength-selective optical elements are demultiplexed into M input ends by means of one channel of light. The M optical receivers include N lasers that are in a working state, and N<M. The N optical receivers correspond to N different wavelengths. When a first optical receiver in the N optical receivers is switched to a second idle optical receiver in the M optical receivers, a wavelength of a wavelength-selective optical element to which the first optical receiver is coupled is adjusted from a first wavelength to a second wavelength, and the second wavelength is different from the wavelengths of the N optical receivers. Both M and N are integers greater than or equal to 1.

With reference to the second aspect, in a first possible implementation manner, a wavelength of a wavelength-selective optical element to which the second optical receiver is coupled is set as the first wavelength; or wavelengths of the second optical receiver and a wavelength-selective optical element to which the second optical receiver is coupled are set to be different from the wavelengths of the N optical receivers and different from the second wavelength.

With reference to the second aspect or the first possible implementation manner of the second aspect, in a second possible implementation manner, the wavelength-selective element is a thin film filter, and the M thin film filters demultiplex one channel of light into M input ends by using a reflector.

With reference to the second aspect or the first possible implementation manner of the second aspect, in a third possible implementation manner, the wavelength-selective element is a microring resonator, and the M microring resonators demultiplex one channel of light into M input ends by using an optical waveguide.

With reference to the second aspect or any possible implementation manner of the second aspect, in a fourth possible implementation manner, the optical receiver further includes a control logic configured to control the first optical receiver in the N optical receivers to switch to the second idle optical receiver in the M optical receivers.

According to a third aspect, an optical network device is provided, including an optical transmitter and an optical receiver, where the optical transmitter is connected to the optical receiver by using a WDM, and the optical transmitter includes the optical transmitter according to the first aspect or any one of the first to fourth possible implementation manners of the first aspect.

According to a fourth aspect, an optical network device is provided, including an optical transmitter and an optical receiver, where the optical transmitter is connected to the optical receiver by using a WDM, and the optical receiver includes the optical receiver according to the second aspect or any one of the first to fourth possible implementation manners of the second aspect.

According to a fifth aspect, a passive optical network PON system is provided, including an optical line terminal OLT, and at least one optical network unit ONU or optical network terminal ONT, where the OLT is connected to the at least one ONU or ONT by using an optical distribution network ODN, and the OLT or the ONU is the apparatus according to the third aspect or the apparatus according to the fourth aspect.

According to a sixth aspect, a method for emitting light by an optical transmitter is provided, where the optical transmitter includes M lasers, the M lasers are coupled to M input ends of M wavelength-selective optical elements, the M lasers correspond to the M wavelength-selective optical elements in a one-to-one manner, the M lasers include N lasers that are in a working state, and N<M. The method includes: switching a first laser in the N lasers to a second idle laser in the M lasers; and adjusting a wavelength of a wavelength-selective optical element to which the first laser is coupled, so that the wavelength of the wavelength-selective optical element is adjusted from a first wavelength to a second wavelength, and the second wavelength is different from the wavelengths of the N lasers, where both M and N are integers greater than or equal to 1.

With reference to the sixth aspect, in a first possible implementation manner, the method further includes adjusting wavelengths of the second laser and a wavelength-selective optical element to which the second laser is coupled, so that the wavelength of the wavelength-selective optical element is changed to the first wavelength; or setting wavelengths of the second laser and a wavelength-selective optical element to which the second laser is coupled to be different from the wavelengths of the N lasers and different from the second wavelength.

With reference to the sixth aspect or the first possible implementation manner of the sixth aspect, in a second possible implementation manner, before the switching a first laser in the N lasers to a second idle laser in the M lasers, the method further includes confirming that the first laser in the N lasers is faulty, and shutting down the first laser.

According to a seventh aspect, a method for receiving light by an optical receiver is provided, where the optical receiver includes M output ends of M wavelength-selective optical elements to which M optical receivers are coupled, the M optical receivers correspond to the M wavelength-selective optical elements in a one-to-one manner, input ends of the M wavelength-selective optical elements are demultiplexed into M input ends by means of one channel of light, the M optical receivers include N lasers that are in a working state, and N<M. The method includes switching a first optical receiver in the N optical receivers to a second idle optical receiver in the M optical receivers; and adjusting a wavelength of a wavelength-selective optical element to which the first optical receiver is coupled, so that the wavelength of the wavelength-selective optical element is adjusted from a first wavelength to a second wavelength, and the second wavelength is different from wavelength of the N optical receivers. Both M and N are integers greater than or equal to 1.

With reference to the seventh aspect, in a first possible implementation manner, the method further includes adjusting wavelengths of the second optical receiver and a wavelength-selective optical element to which the second optical receiver is coupled, so that the wavelength of the wavelength-selective optical element is changed to the first wavelength; or setting wavelengths of the second optical receiver and a wavelength-selective optical element to which the second optical receiver is coupled to be different from the wavelengths of the N optical receivers and different from the second wavelength.

With reference to the seventh aspect or the first possible implementation manner of the seventh aspect, in a second possible implementation manner, before the switching a first optical receiver in the N optical receivers to a second idle optical receiver in the M optical receivers, the method further includes confirming that the first optical receiver in the N optical receivers is faulty, and shutting down the first laser.

Beneficial effects of the present invention are as follows:

In the embodiments of the present invention, an optical transmitter includes M lasers, where N lasers are in a working state, and N<M. When a first laser in the N lasers is switched to a second laser, in an idle state, in the M lasers, a wavelength of a wavelength-selective optical element to which the first laser is coupled is adjusted, so that the wavelength is changed from a first wavelength to a second wavelength, and the second wavelength cannot be equal to wavelengths of N types of light emitted by the N lasers. A principle of a receiver is similar. Some of M lasers are set to be in an idle state, so that when a fault occurs on one of N lasers, switching to an idle laser is performed. In addition, a wavelength of a wavelength-selective optical element to which the faulty laser is coupled is changed, so that the optical transmitter normally emits light. According to this technical solution, problems in the prior art can be resolved: complexity of an optical transmitter is relatively high, an extra power loss is relatively large, and a output optical power rate is relatively low.

DETAILED DESCRIPTION OF ILLUSTRATIVE EMBODIMENTS

Figure 1A:
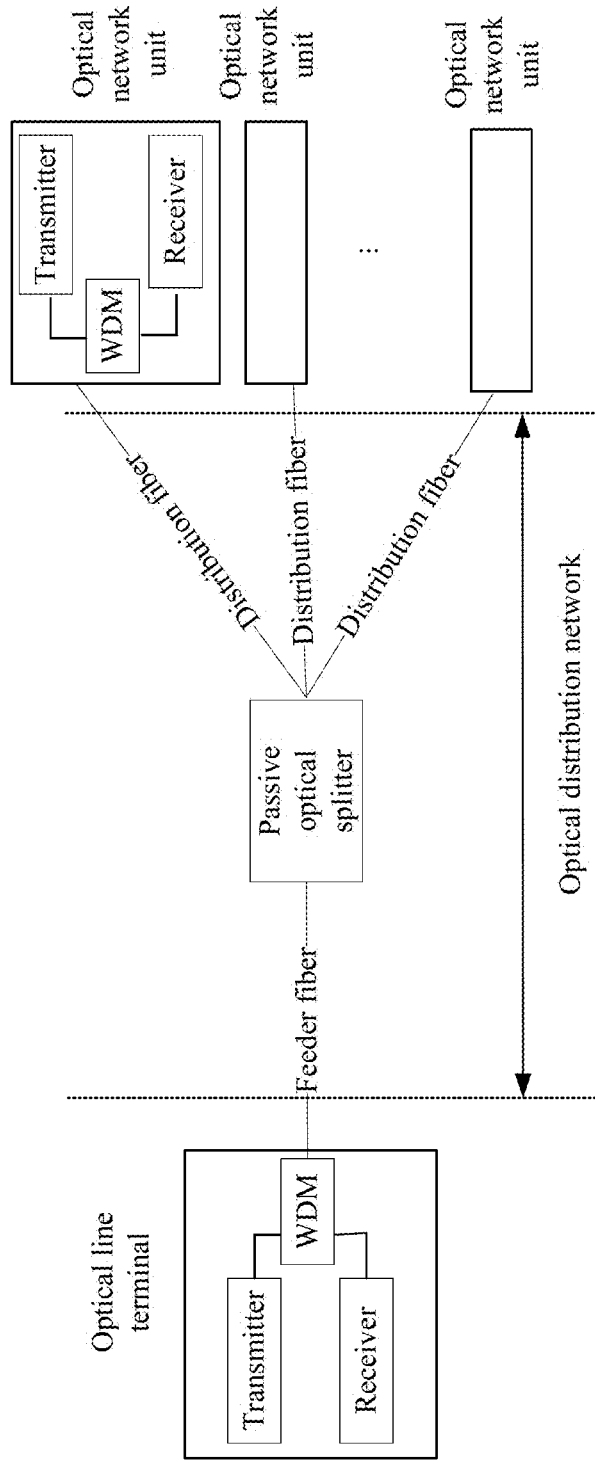
FIG. 1A is a schematic diagram of a network architecture of a PON system in the prior art.
Figure 1B:
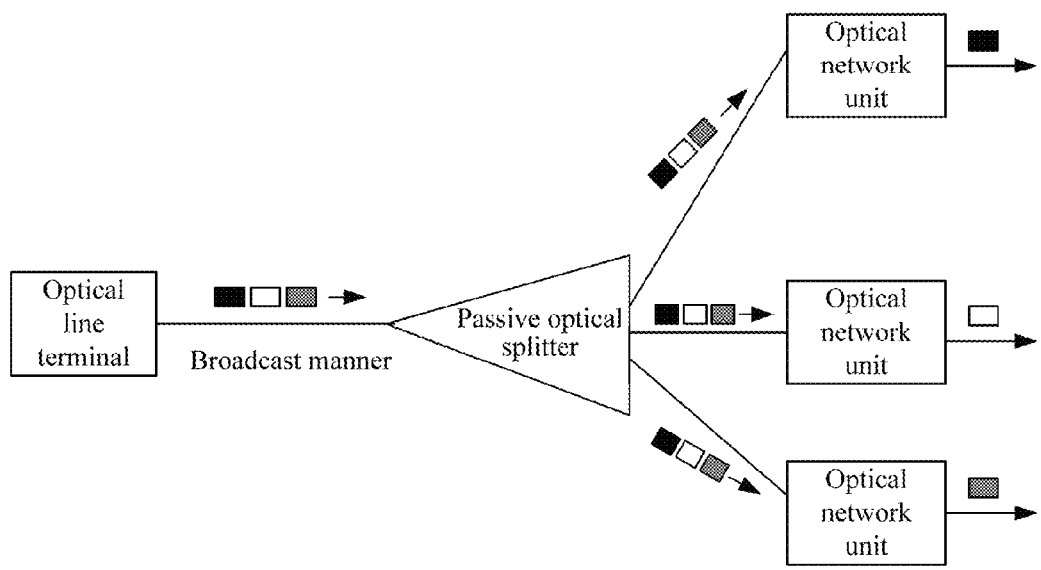
FIG. 1B is a schematic diagram of downlink transmission in a PON system in the prior art.
Figure 1C:
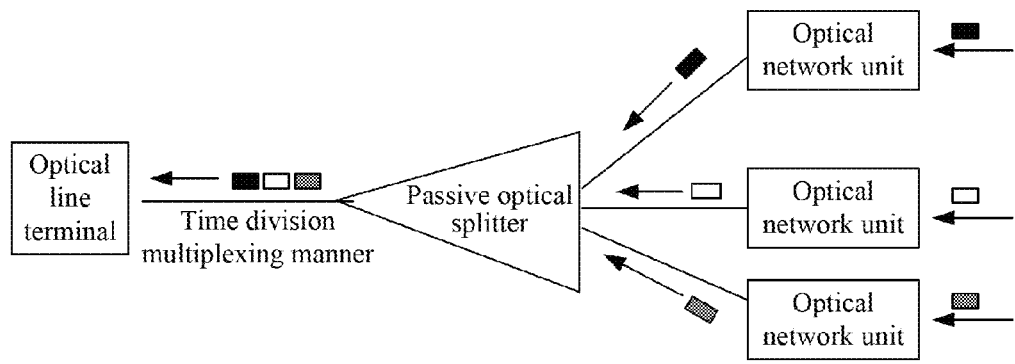
FIG. 1C is a schematic diagram of uplink transmission in a PON system in the prior art.
Figure 1D:
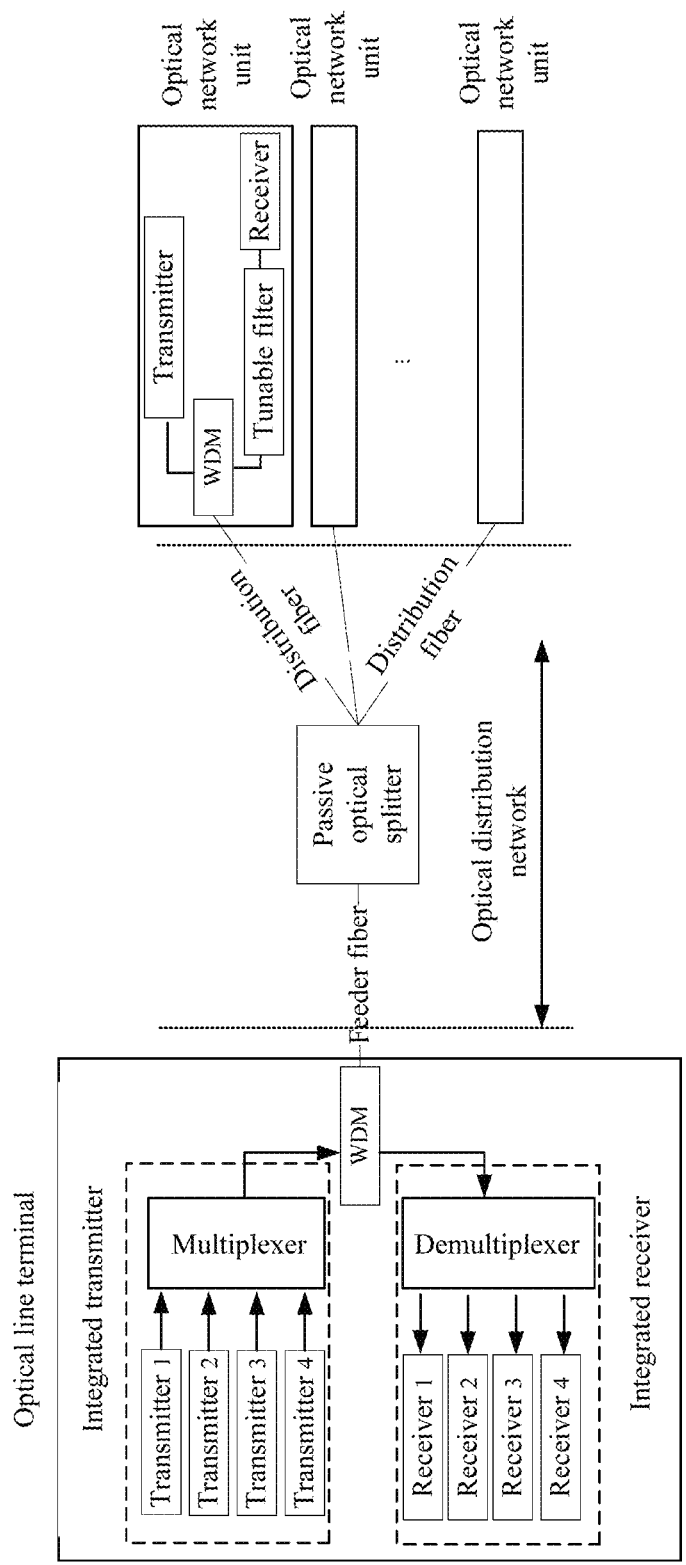
FIG. 1D is a schematic diagram of a functional structure of a TWDM-PON system in the prior art.
Figure 1E:
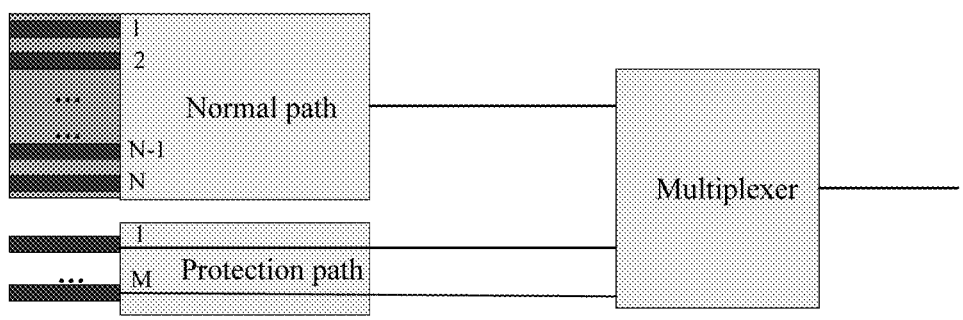
FIG. 1E is a schematic structural diagram of an optical transmitter module in the prior art.

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

In addition, usually the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

In order to reduce an extra optical power loss and improve output optical power efficiency, in the embodiments of the present invention, an optical transmitter and an optical receiver are provided. The optical transmitter includes M lasers and M wavelength-selective optical elements, wherein the M lasers are coupled to M input ends of the M wavelength-selective optical elements, the M lasers correspond to the M wavelength-selective optical elements in a one-to-one manner, and a wavelength of each wavelength-selective optical element is set to be consistent with a wavelength of a coupled laser.

M output ends of the M wavelength-selective optical elements are coupled as one channel.

The M lasers include N lasers that are in a working state, where N<M.

The N lasers correspond to N different wavelengths.

When a first laser in the N lasers is switched to a second idle laser in the M lasers, a wavelength of a wavelength-selective optical element to which the first laser is coupled is adjusted from a first wavelength to a second wavelength, and the second wavelength is different from the wavelengths of the N lasers, where both M and N are integers greater than or equal to 1. In this solution, when a laser that is of an optical transmitter and that is in a working state is faulty, a laser in an idle state is activated. In addition, a wavelength of an optical element to which the faulty laser is coupled is changed, so that the wavelength of the optical element is not equal to a wavelength of light emitted by a laser in the working state. Compared with a light combination device (for example, a Splitter) used in the prior art, in this technical solution, a power loss is lower. Therefore, according to this solution, a power loss can be further reduced and output optical power efficiency can be further improved.

The present invention further provides an optical receiver. The optical receiver includes M optical receivers and M wavelength-selective optical elements, wherein the M optical receivers are coupled to M output ends of the M wavelength-selective optical elements, the M optical receivers correspond to the M wavelength-selective optical elements in a one-to-one manner, and a wavelength of each wavelength-selective optical element is set to be consistent with a wavelength of a coupled optical receiver.

Input ends of the M wavelength-selective optical elements are demultiplexed into M input ends by means of one channel of light.

The M optical receivers include N lasers that are in a working state, where N<M.

The N optical receivers correspond to N different wavelengths.

When a first optical receiver in the N optical receivers is switched to a second idle optical receiver in the M optical receivers, a wavelength of a wavelength-selective optical element to which the first optical receiver is coupled is adjusted from a first wavelength to a second wavelength, and the second wavelength is different from the wavelengths of the N optical receivers, where both M and N are integers greater than or equal to 1.

The following describes exemplary implementation manners of the present invention in detail with reference to the accompanying drawings.

Embodiment 1

Figure 2:
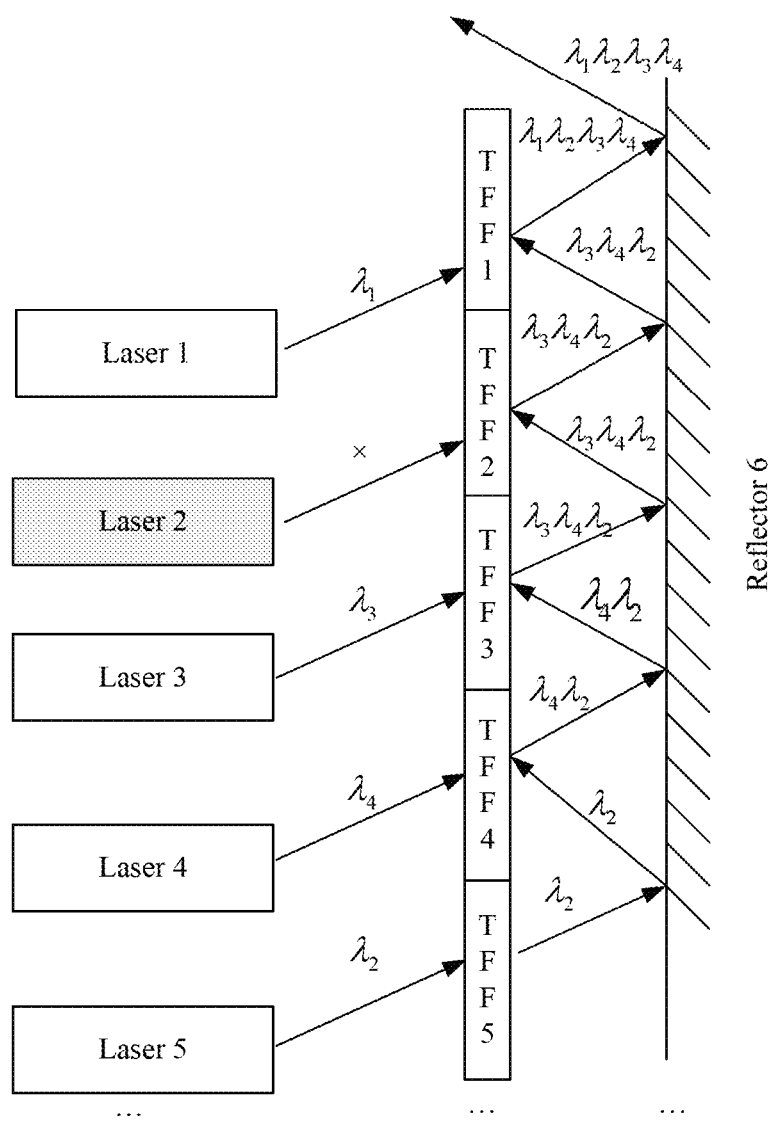
FIG. 2 is a schematic diagram of an optical transmitter with a faulty laser according to an embodiment of the present invention.

Referring to FIG. 2, an optical transmitter in a first embodiment of the present invention is as follows:

The optical transmitter in the first embodiment includes: M lasers and M wavelength-selective optical elements, where the M lasers are coupled to M input ends of the M wavelength-selective optical elements, where the M lasers correspond to the M wavelength-selective optical elements in a one-to-one manner, and a wavelength of each wavelength-selective optical element is set to be consistent with a wavelength of a coupled laser.

In this embodiment, an example in which M=5 and N=4 is used for description, that is, the optical transmitter includes 5 lasers, where optical transmitters 1 to 4 are in a working state, and an optical transmitter 5 is in an idle state. The wavelength-selective optical element is a wavelength-tunable TFF (Thin Film Filter, thin film filter), and M output ends of the M TFFs are coupled as one channel by using a reflector. The M lasers include N lasers that are in a working state, where N<M. The N lasers correspond to N different wavelengths and are corresponding to light of four different wavelengths $\lambda_1$, $\lambda_2$, $\lambda_3$ and $\lambda_4$ respectively.

Optionally, the optical transmitter further includes control logic. The control logic is configured to control a first laser in the N lasers to switch to a second idle laser in the M lasers.

For example, as shown in FIG. 2, the optical transmitter includes working lasers 1 to 4, one idle laser 5, four TFFs 1 to 4 coupled with the working lasers 1 to 4, and one TFF 5 coupled with the idle laser 5. The four working lasers respectively emit light of four different wavelengths $\lambda_1$, $\lambda_2$, $\lambda_3$, and $\lambda_4$. The corresponding four TFFs can transmit only light of the four different wavelengths $\lambda_1$, $\lambda_2$, $\lambda_3$, and $\lambda_4$, and reflect all light of the other wavelengths. That is, the TFF 2 corresponding to the laser 2 can transmit only light of the wavelength $\lambda_2$, and reflect all light of the other wavelengths, and so on. A function of the apparatus shown in FIG. 2 is to combine light that is of the four different wavelengths $\lambda_1$, $\lambda_2$, $\lambda_3$, and $\lambda_4$, and that is respectively emitted by the four working lasers into one channel of light.

When the second laser 2 is faulty (before the second laser 2 is faulty, a wavelength of emitted light is $\lambda_2$), the laser 5 is set to emit light of a same wavelength as the faulty laser 2, and a wavelength of transmitted light of the TFF 2 corresponding to the laser 2 is adjusted, so that the transmittance wavelength is adjusted from $\lambda_2$, to any wavelength that is different from $\lambda_1$, $\lambda_2$, $\lambda_3$, and $\lambda_4$, that is, the TFF 2 reflects all light of the wavelengths $\lambda_1$, $\lambda_2$, $\lambda_3$, and $\lambda_4$. A transmittance wavelength of the TFF 5 corresponding to the laser 5 is adjusted to $\lambda_2$, so as to ensure that light of $\lambda_2$, emitted by the laser 5 can be transmitted by the TFF 5.

In this embodiment, if the TFF 2 corresponding to the faulty laser 2 still transmits light whose wavelength is $\lambda_2$, light whose wavelength is $\lambda_2$ and that is transmitted by the TFF 5 is transmitted again when passing through the TFF 2 corresponding to the faulty laser 2. In this case, light respectively corresponding to $\lambda_1\lambda_2\lambda_3\lambda_4$ cannot be completely coincided and cannot be combined into one channel of light. If the active TFF 2 corresponding to the faulty laser 2 transmits none of light whose wavelengths are $\lambda_1\lambda_2\lambda_3\lambda_4$, all light whose wavelength is $\lambda_2$ and that is transmitted by the TFF 5 is reflected instead of being transmitted when passing through the TFF 2 corresponding to the faulty laser 2; and all light respectively corresponding to $\lambda_1\lambda_2\lambda_3\lambda_4$ is coincided and is finally combined into one channel of light.

Optionally, in another specific application, when the second laser 2 is faulty (before the second laser 2 is faulty, a wavelength of emitted light is $\lambda_2$), the laser 5 may also be set to emit light of any wavelength that is different from $\lambda_1$, $\lambda_2$, $\lambda_3$, and $\lambda_4$ and that is not equal to an adjusted wavelength of the TFF 2, and a wavelength of the TFF 5 corresponding to the laser 5 is adjusted to be equal to an adjusted wavelength of the laser 5.

Optionally, detecting that the second laser 2 is faulty may be implemented by the control logic, or may be implemented by an external controller connected to the optical transmitter.

Optionally, setting the laser 5 to emit the light of the same wavelength as the faulty laser 2, and adjusting the transmittance wavelength of the TFF 2 corresponding to the laser 2 may be implemented by the internal control logic of the optical transmitter, or may be implemented by an external controller connected to the optical transmitter.

Optionally, adjusting the transmittance wavelength of the TFF 5 corresponding to the laser 5 to $\lambda_2$ may be implemented by the control logic, or may be implemented by an external controller connected to the optical transmitter.

Optionally, adjusting the wavelength of the TFF 2 corresponding to the laser 2 from $\lambda_2$ to any wavelength that is different from $\lambda_1\lambda_2\lambda_3\lambda_4$ may be implemented by the control logic, or may be implemented by an external controller connected to the optical transmitter.

Further, adjusting the wavelength of the TFF 2 may be implemented by means of changing a temperature or changing an angle of the TFF 2.

To sum up, in order to ensure that a laser 5 can replace, if any one of lasers 1 to 4 (for example, the laser 2) is faulty, the faulty laser 2 to emit light, and that the light emitted by the laser 5 and light emitted by all the lasers that are not faulty can be finally coincided and combined into one channel of light, the laser 5 needs to emit light of a same wavelength as the faulty laser 2, and a wavelength of a TFF 2 corresponding to the faulty laser 2 also needs to be adjusted, so as to ensure that the TFF 2 does not transmit but reflects all light emitted by any laser that is not faulty and the laser 5.

In this solution, when a laser that is of an optical transmitter and that is in a working state is faulty, a laser in an idle state is activated. In addition, a wavelength of an optical element to which the faulty laser is coupled is changed, so that the wavelength of the optical element is not equal to a wavelength of light emitted by a laser in the working state. Compared with a light combination device (for example, a Splitter) used in the prior art, in this technical solution, the optical transmitter in this technical solutions incurs a smaller power loss. Therefore, according to this solution, a power loss can be further reduced and output optical power efficiency can be further improved.

Embodiment 2

Figure 3:
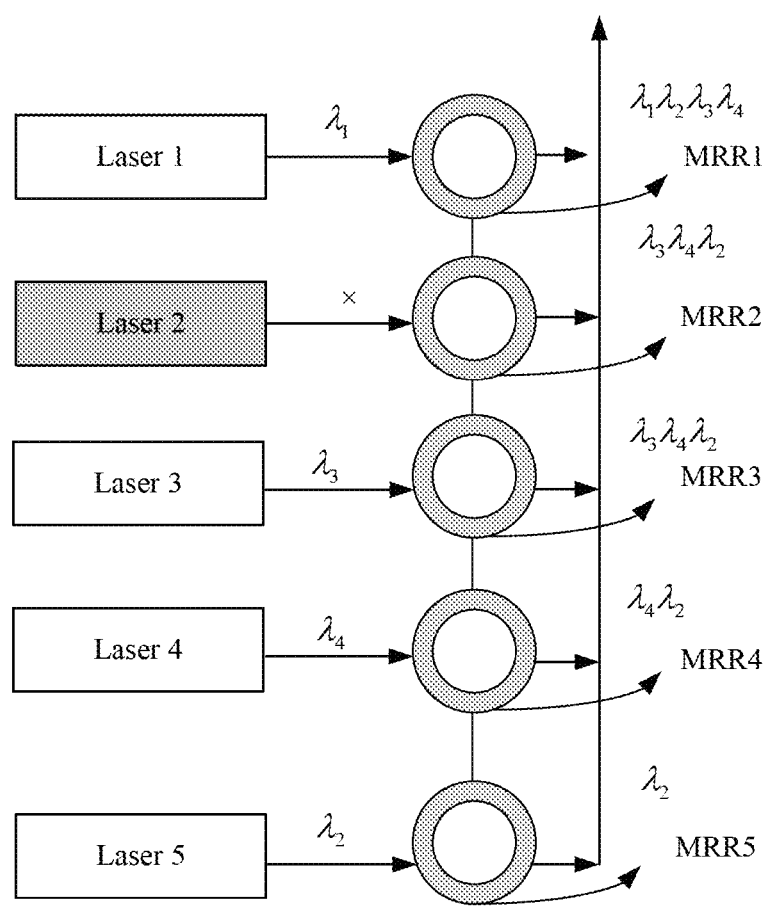
FIG. 3 is a schematic diagram of an optical transmitter with a faulty laser according to an embodiment of the present invention.

Referring to FIG. 3, an optical transmitter in a second embodiment of the present invention is as follows:

M lasers, and M input ends of M wavelength-selective optical elements to which the M lasers are coupled, where the M lasers correspond to the M wavelength-selective optical elements in a one-to-one manner, and a wavelength of each wavelength-selective optical element is set to be consistent with a wavelength of a coupled laser.

In this embodiment, an example in which M=5 and N=4 is used for description, that is, the optical transmitter includes 5 lasers, where optical transmitters 1 to 4 are in a working state, and an optical transmitter 5 is in an idle state. The wavelength-selective optical element is a wavelength-tunable MRR (Micro-Ring Resonator, microring resonator), and M output ends of the M MRRs are coupled as one channel by using an optical waveguide. The M lasers include N lasers that are in a working state, where N<M. The N lasers correspond to N different wavelengths and are corresponding to light of four different wavelengths $\lambda_1$, $\lambda_2$, $\lambda_3$, and $\lambda_4$ respectively.

Optionally, the optical transmitter further includes control logic. The control logic is configured to control a first laser in the N lasers to switch to a second idle laser in the M lasers.

For example, as shown in FIG. 3, the optical transmitter includes four working lasers 1 to 4 and respectively coupled MRRs 1 to 4, and an idle laser 5 and a coupled MRR 5. The four lasers 1 to 4 respectively send light of four different wavelengths □□□□□□□□□□ and □□. If the second laser 2 sorted from the top is faulty (before the second laser 2 is faulty, a wavelength of emitted light is $\lambda_2$), the laser 5 is set to emit light whose wavelength is $\lambda_2$, and a resonance wavelength of the MRR 5 is also adjusted to $\lambda_2$, so as to ensure that the MRR 5 can perform optical path deflection on an optical path whose wavelength is $\lambda_2$ and that is emitted by the laser 5, for example, perform counterclockwise rotation by 90° for transmission from down to up. In this case, a wavelength of the MRR 2 corresponding to the second laser 2 that is faulty further needs to be adjusted, so that the wavelength of the MRR 2 is different from any wavelength of □□□□□□□□, and □□. Therefore, the MRR 2 corresponding to the second laser 2 that is faulty does not perform any optical path turning on light whose wavelengths are □□□□□□□□□□ and □□. A reason is that: if the MRR 2 corresponding to the second laser 2 still adjusts a propagation direction of the light whose wavelength is $\lambda_2$, when light whose optical path is adjusted by the MRR 5 and whose wavelength is $\lambda_2$ passes through the MRR 2 corresponding to the second laser 2, an optical path is turned again, and as a result, light respectively corresponding to $\lambda_1\lambda_2\lambda_3\lambda_4$ cannot be completely coincided; if the MRR 2 corresponding to the second laser 2 that is faulty does not perform any optical path turning on light of $\lambda_1\lambda_2\lambda_3\lambda_4$, when light whose optical path is adjusted by the MRR 5 and whose wavelength is $\lambda_2$ passes through the MRR 2 corresponding to the second laser 2, an optical path is not changed, that is, a propagation direction is not changed and propagation is still performed from down to up, and finally, all light respectively corresponding to $\lambda_1\lambda_2\lambda_3\lambda_4$ is coincided and combined into one channel of light.

Optionally, in another specific application, when the second laser 2 is faulty (before the second laser 2 is faulty, a wavelength of emitted light is $\lambda_2$), the laser 5 may also be adjusted to emit light of any wavelength that is different from $\lambda_1$, $\lambda_2$, $\lambda_3$, and $\lambda_4$, and that is not equal to an adjusted wavelength of the MRR 2. In addition, a resonance wavelength of the MRR 5 is adjusted to be equal to an adjusted wavelength of the laser 5.

Optionally, detecting that the second laser 2 is faulty may be implemented by the control logic, or may be implemented by an external controller connected to the optical transmitter.

Optionally, setting the laser 5 to emit light of a same wavelength as the faulty laser 2, and adjusting a transmittance wavelength of the MRR 2 corresponding to the laser 2 may be implemented by the internal control logic of the optical transmitter, or may be implemented by an external controller connected to the optical transmitter.

Optionally, adjusting a transmittance wavelength of the MRR 5 corresponding to the laser 5 to $\lambda_2$ may be implemented by the control logic, or may be implemented by an external controller connected to the optical transmitter.

Optionally, adjusting the wavelength of the coupled MRR 2 of the laser 2 may be implemented by the control logic, or may be implemented by an external controller connected to the optical transmitter.

Further, the wavelength of the MRR 2 may be adjusted by means of changing a temperature of the MRR 2 or injecting a current.

To sum up, in order to ensure that a laser 5 can replace, in a case in which a second laser 2 is faulty, the second laser 2 to emit light, and that the light emitted by the laser 5 can finally coincide with light emitted by the other lasers that are not faulty, a wavelength of an MRR 2 corresponding to the second laser 2 needs to be adjusted to ensure that the MRR 2 does not perform any optical path turning on light emitted by any one of the lasers, so that when the light emitted by the any one of the lasers passes through the MRR 2 corresponding to the second laser 2, an optical path is not changed, that is, a propagation direction is not changed and propagation is still performed according to an original propagation direction.

In this solution, when a laser that is of an optical transmitter and that is in a working state is faulty, a laser in an idle state is activated. In addition, a wavelength of an optical element to which the faulty laser is coupled is changed, so that the wavelength of the optical element is not equal to a wavelength of light emitted by a laser in the working state. Compared with a light combination device (for example, a Splitter) used in the prior art, in this technical solution, a power loss is lower. Therefore, according to this solution, a power loss can be further reduced and output optical power efficiency can be further improved.

Embodiment 3

Figure 4:
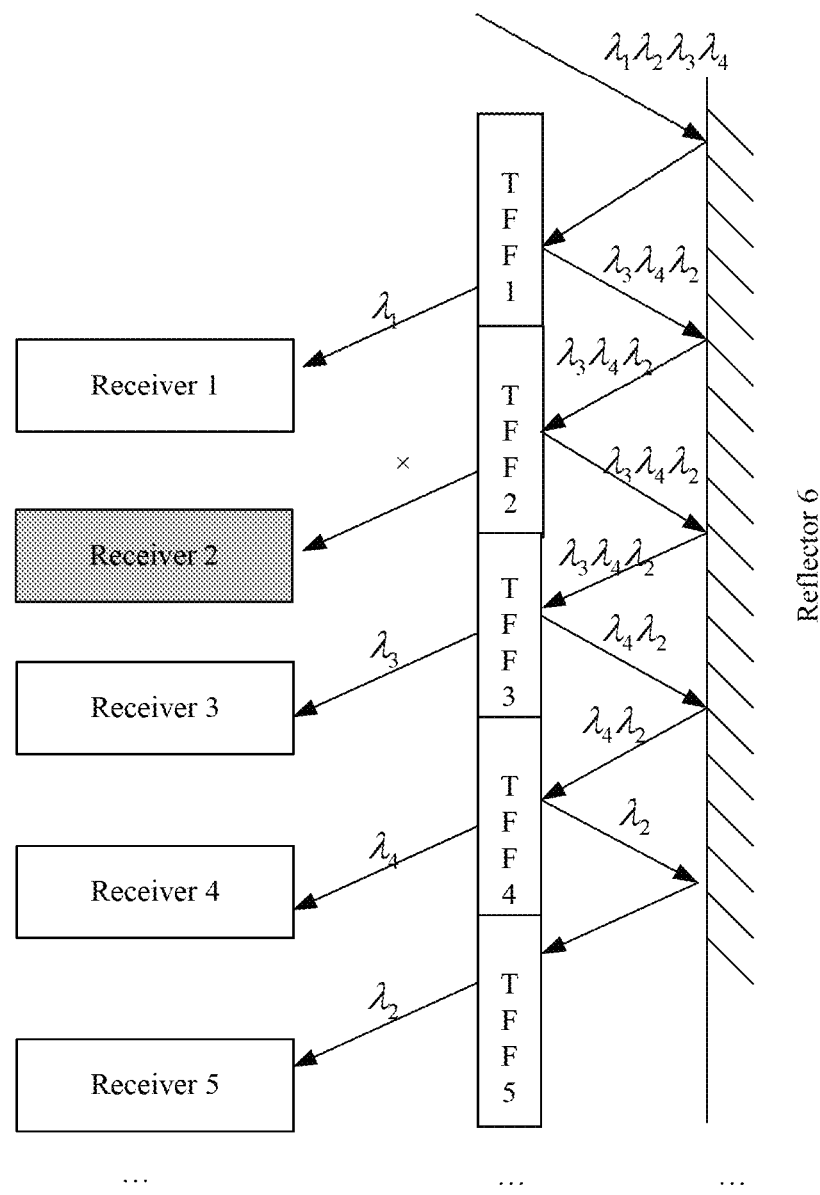
FIG. 4 is a schematic diagram of an optical receiver with a faulty optical receiver according to an embodiment of the present invention.

Referring to FIG. 4, an optical receiver in a first embodiment of the present invention is as follows:

M optical receivers and M wavelength-selective optical elements, wherein the M optical receivers are coupled to M output ends of the M wavelength-selective optical elements, the M optical receivers correspond to the M wavelength-selective optical elements in a one-to-one manner, and a wavelength of each wavelength-selective optical element is set to be consistent with a wavelength of a coupled optical receiver.

In this embodiment, an example in which M=5 and N=4 is used for description, that is, the optical receiver includes 5 optical receivers, where optical receivers 1 to 4 are in a working state, and an optical receiver 5 is in an idle state. The wavelength-selective optical element is a wavelength-tunable TFF (Thin Film Filter, thin film filter), and input ends of the M TFFs are demultiplexed into M input ends by means of one channel of light. The N optical receivers correspond to N different wavelengths, corresponding to light of four different wavelengths $\lambda_1$, $\lambda_2$, $\lambda_3$, and $\lambda_4$ respectively.

Optionally, the optical receiver further includes control logic, configured to control a first optical receiver in the N optical receivers to switch to a second idle optical receiver in the M optical receivers.

For example, as shown in FIG. 4, when the second optical receiver 2 sorted from the top is faulty (before the second optical receiver 2 is faulty, a wavelength of received light is $\lambda_2$), a wavelength of light received by the optical receiver 5 is adjusted to $\lambda_2$, and, a wavelength of a TFF 5 corresponding to the optical receiver 5 is also adjusted to $\lambda_2$, so as to ensure that light of $\lambda_2$ received by the optical receiver 5 can be transmitted by the corresponding TFF 5.

In this case, a wavelength of a TFF 2 corresponding to the second optical receiver 2 that is faulty is adjusted, so that the wavelength of the TFF 2 is not equal to any wavelength of $\lambda_1$, $\lambda_2$, $\lambda_3$, and $\lambda_4$. Therefore, the TFF 2 corresponding to the second optical receiver 2 that is faulty reflects all light whose wavelengths are $\lambda_1$, $\lambda_2$, $\lambda_3$, and $\lambda_4$. A reason is that if the TFF 2 corresponding to the second optical receiver 2 still transmits light whose wavelength is $\lambda_2$, the TFF 5 corresponding to the optical receiver 5 cannot receive the light whose wavelength is $\lambda_2$, and therefore cannot transmit the light whose wavelength is $\lambda_2$. As a result, the optical receiver 5 cannot receive the light whose wavelength is $\lambda_2$. Although the TFF 2 corresponding to the second optical receiver 2 still transmits the light whose wavelength is $\lambda_2$, the second optical receiver 2 is faulty and cannot receive the light whose wavelength is $\lambda_2$. Therefore, the optical receiver 2 cannot receive the light whose wavelength is $\lambda_2$.

Optically, when the second optical receiver 2 is faulty (before the second optical receiver 2 is faulty, a wavelength of received light is $\lambda_2$), a wavelength of light received by the optical receiver 5 may further be adjusted to any wavelength that is different from $\lambda_1$, $\lambda_2$, $\lambda_3$, and $\lambda_4$ and that cannot be equal to an adjusted wavelength of a TFF 2. In addition, a wavelength of a TFF 5 corresponding to the optical receiver 5 is adjusted to be equal to a wavelength of the optical receiver 5.

Optionally, detecting that the second optical receiver 2 is faulty may be implemented by the control logic, or may be implemented by an external controller connected to the optical receiver.

Optionally, setting the optical receiver 5 to receive light of a same wavelength as the faulty optical receiver 2, and adjusting a transmittance wavelength of the TFF 2 corresponding to the optical receiver 2 may be implemented by the internal control logic of the optical receiver, or may be implemented by an external controller connected to the optical receiver.

Optionally, adjusting a transmittance wavelength of the TFF 5 corresponding to the optical receiver 5 to $\lambda_2$ may be implemented by the control logic, or may be implemented by an external controller connected to the optical receiver.

Optionally, adjusting the wavelength of the TFF 2 corresponding to the optical receiver 2 from $\lambda_2$ to the any wavelength that is different from $\lambda_1\lambda_2\lambda_3\lambda_4$ may be implemented by the control logic, or may be implemented by an external controller connected to the optical receiver.

Further, adjusting the wavelength of the TFF 2 may be implemented by means of changing a temperature or changing an angle of the TFF 2.

To sum up, in order to ensure that an optical receiver 5 and its corresponding TFF 5 can replace, in a case in which a second optical receiver is faulty, the second optical receiver 2 to receive light whose wavelength is $\lambda_2$, a transmittance wavelength of a TFF 2 corresponding to the second optical receiver 2 needs to be adjusted to ensure that total reflection instead of transmittance is performed on light whose wavelengths are $\lambda_1$, $\lambda_2$, $\lambda_3$, and $\lambda_4$.

Embodiment 4

Figure 5:
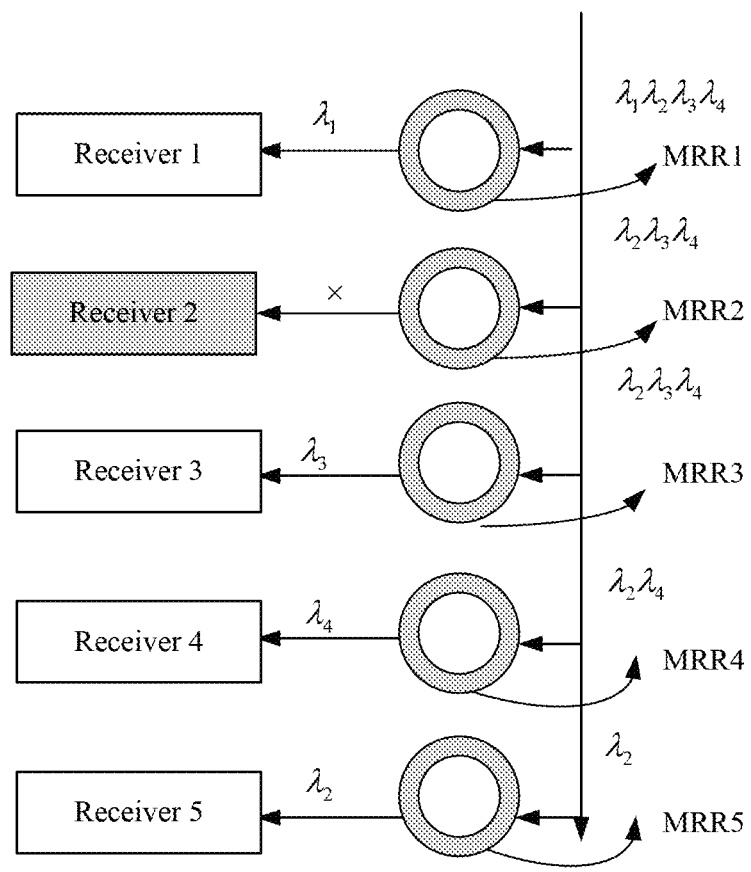
FIG. 5 is a schematic diagram of an optical receiver with a faulty optical receiver according to an embodiment of the present invention.

Referring to FIG. 5, an optical receiver in a second embodiment of the present invention is as follows:

M optical receivers and M wavelength-selective optical elements, wherein the M optical receivers are coupled to M output ends of the M wavelength-selective optical elements, the M optical receivers correspond to the M wavelength-selective optical elements in a one-to-one manner, and a wavelength of each wavelength-selective optical element is set to be consistent with a wavelength of a coupled optical receiver.

In this embodiment, an example in which M=5 and N=4 is used for description, that is, the optical receiver includes 5 optical receivers, where optical receivers 1 to 4 are in a working state, and an optical receiver 5 is in an idle state. The wavelength-selective optical element is a wavelength-tunable MRR (Micro-Ring Resonator, microring resonator), and input ends of the M MRRs are demultiplexed into M input ends by means of one channel of light. The N optical receivers correspond to N different wavelengths, corresponding to light of four different wavelengths $\lambda_1$, $\lambda_2$, $\lambda_3$, and $\lambda_4$ respectively.

Optionally, the optical receiver further includes control logic, configured to control a first optical receiver in the N optical receivers to switch to a second idle optical receiver in the M optical receivers.

For example, as shown in FIG. 5, when the second optical receiver 2 sorted from the top is faulty (before the second optical receiver 2 is faulty, a wavelength of received light is $\lambda_2$), the optical receiver 5 is adjusted to receive light whose wavelength is $\lambda_2$, and a resonance wavelength of an MRR 5 is also adjusted to $\lambda_2$, so as to ensure that the MRR 5 can perform optical path turning on light of $\lambda_2$ received by the optical receiver 5, for example, perform clockwise rotation by 90°.

In this case, a wavelength of an MRR 2 corresponding to the second optical receiver 2 that is faulty is adjusted, so that the wavelength of the MRR 2 is not equal to any wavelength of $\lambda_1$, $\lambda_2$, $\lambda_3$, and $\lambda_4$. Therefore, the MRR 2 corresponding to the second optical receiver 2 that is faulty does not perform any optical path turning on light whose wavelengths are $\lambda_1$, $\lambda_2$, $\lambda_3$, and $\lambda_4$. A reason is that if the MRR 2 corresponding to the second optical receiver 2 still performs optical path turning on light whose wavelength is $\lambda_2$, one channel of light received by the MRR 5 does not include the light whose wavelength is $\lambda_2$, and therefore optical path turning cannot be performed. As a result, the optical receiver 5 cannot receive the light whose wavelength is $\lambda_2$, either. Although the MRR 2 corresponding to the second optical receiver 2 still performs optical path turning on the light whose wavelength is $\lambda_2$, the second optical receiver 2 is faulty and cannot receive light. Therefore, the light whose wavelength is $\lambda_2$ cannot be received by the optical receiver 2 included in the optical receiver. Therefore, in order to ensure that the optical receiver 5 can replace, in a case in which the second optical receiver 2 is faulty, the second optical receiver 2 to receive light, a resonance wavelength of the MRR 2 corresponding to the second optical receiver 2 needs to be adjusted to ensure that the MRR 2 does not perform optical path turning on light whose wavelengths are $\lambda_1$, $\lambda_2$, $\lambda_3$, and $\lambda_4$, and light passing through the MRR 2 is still propagated according to an original propagation direction.

Optically, when the second optical receiver 2 is faulty (before the second optical receiver 2 is faulty, a wavelength of received light is $\lambda_2$), a receiving wavelength of the optical receiver 5 is adjusted to be not equal to any wavelength of $\lambda_1$, $\lambda_2$, $\lambda_3$, and $\lambda_4$, and cannot be equal to an adjusted wavelength of the MRR 2. In addition, a resonance wavelength of an MRR 5 is adjusted to be equal to a wavelength of the optical receiver 5.

Optionally, detecting that the second optical receiver 2 is faulty may be implemented by the control logic, or may be implemented by an external controller connected to the optical receiver.

Optionally, setting the optical receiver 5 to receive light of a same wavelength as the faulty optical receiver 2, and adjusting a transmittance wavelength of the TFF 2 corresponding to the optical receiver 2 may be implemented by the internal control logic of the optical receiver, or may be implemented by an external controller connected to the optical receiver.

Optionally, adjusting a transmittance wavelength of the TFF 5 corresponding to the optical receiver 5 to $\lambda_2$ may be implemented by the control logic, or may be implemented by an external controller connected to the optical receiver.

Optionally, adjusting the wavelength of the TFF 2 corresponding to the optical receiver 2 from $\lambda_2$ to the any wavelength that is different from $\lambda_1\lambda_2\lambda_3\lambda_4$ may be implemented by the control logic, or may be implemented by an external controller connected to the optical receiver.

Further, adjusting the wavelength of the TFF 2 may be implemented by means of changing a temperature or changing an angle of the TFF 2.

Embodiment 5

Figure 6:
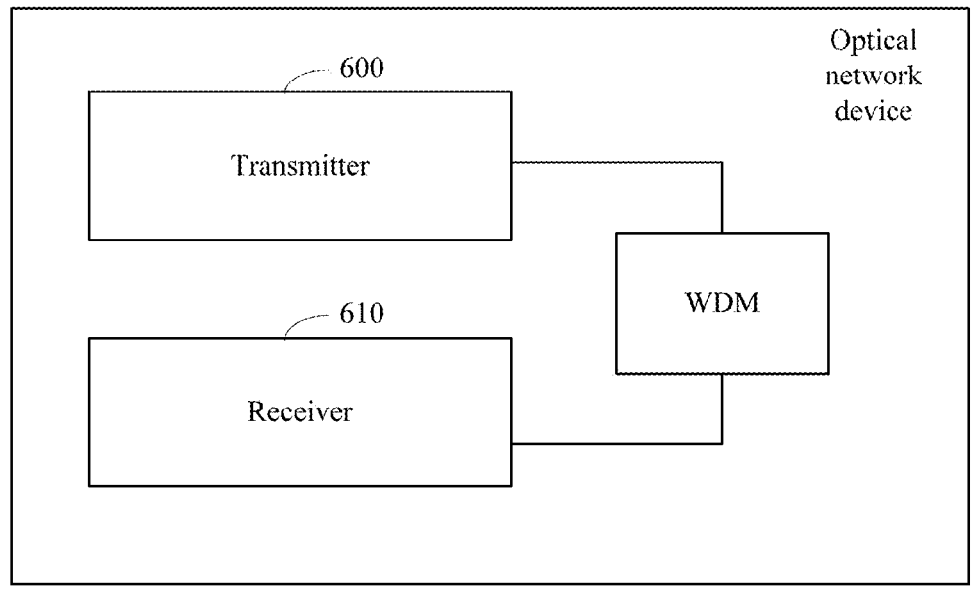
FIG. 6 is a first schematic structural diagram of an apparatus according to an embodiment of the present invention.

In this embodiment of the present invention, as shown in FIG. 6, an optical network device is further provided, including an optical transmitter 600 and an optical receiver 610, where the optical transmitter is connected to the optical receiver by using a WDM, and the optical transmitter is the optical transmitter in Embodiment 1 or Embodiment 2.

Specifically, the optical network device may be an OLT, an ONU, or an ONT.

Embodiment 6

Figure 7:
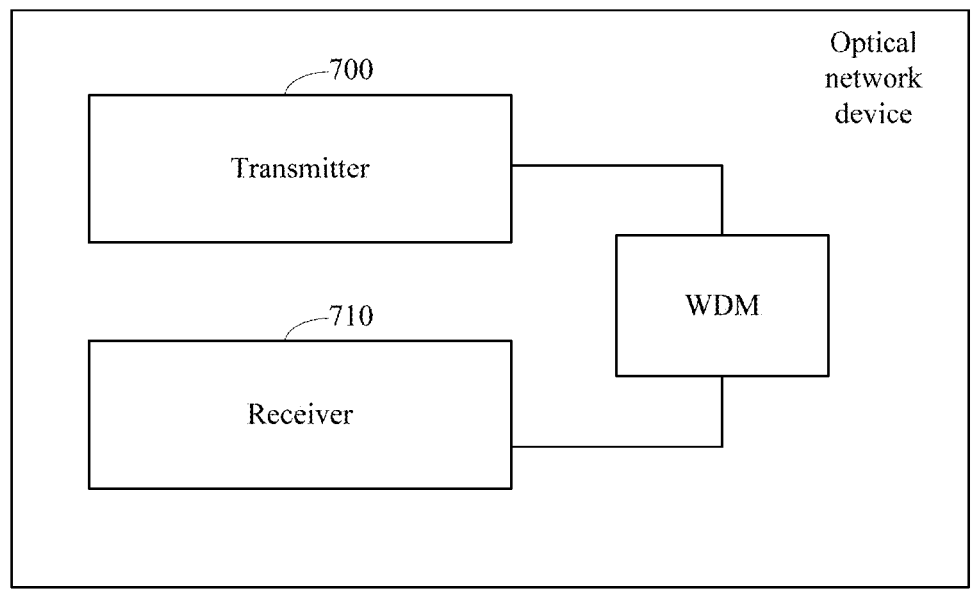
FIG. 7 is a second schematic structural diagram of an apparatus according to an embodiment of the present invention.

As shown in FIG. 7, an optical network device is further provided, including an optical transmitter 700 and an optical receiver 710, where the optical transmitter is connected to the optical receiver by using a WDM, and the optical receiver is the optical receiver in Embodiment 3 or Embodiment 4.

Specifically, the optical network device may be an OLT, an ONU, or an ONT.

Embodiment 7

Figure 8:
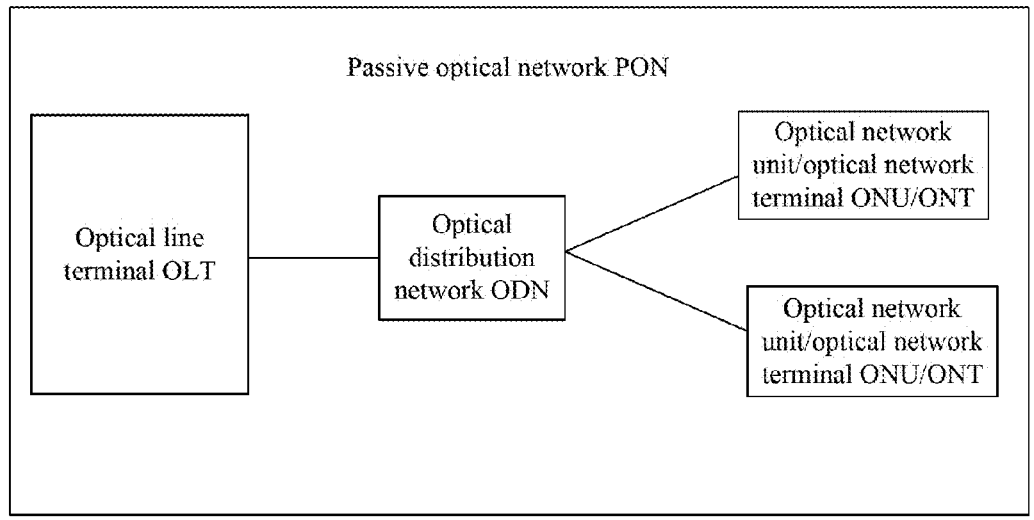
FIG. 8 is a schematic structural diagram of a PON according to an embodiment of the present invention.

In this embodiment of the present invention, as shown in FIG. 8, a PON system is further provided, including an OLT, and at least one ONU or ONT, where the OLT is connected to the at least one ONU or ONT by using an ODN, and the OLT or ONU is the optical network device shown in FIG. 6 or FIG. 7.

Embodiment 8

Figure 9:
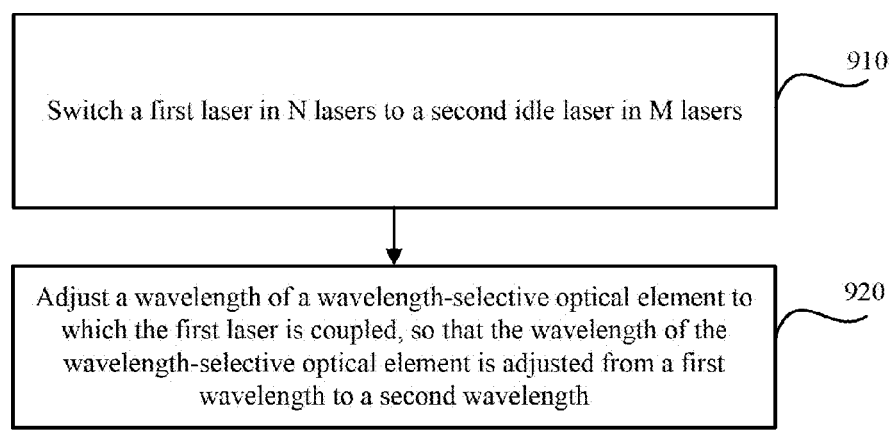
FIG. 9 is a detailed procedure of emitting light by an optical transmitter according to an embodiment of the present invention.

As shown in FIG. 9, this embodiment of the present invention provides a method for emitting light by an optical transmitter. The optical transmitter is the optical transmitter described in Embodiment 1 or Embodiment 2. The optical transmitter includes M lasers; the M lasers are coupled to M input ends of M wavelength-selective optical elements; the M lasers correspond to the M wavelength-selective optical elements in a one-to-one manner; a wavelength of each wavelength-selective optical element is set to be consistent as a wavelength of a coupled laser; the M lasers include N lasers that are in a working state, where N<M. The method includes:

Step 910: Switch a first laser in the N lasers to a second idle laser in the M lasers.

Step 920: Adjust a wavelength of a wavelength-selective optical element to which the first laser is coupled, so that the wavelength of the wavelength-selective optical element is adjusted from a first wavelength to a second wavelength, and the second wavelength is different from the N wavelengths, where both M and N are integers greater than or equal to 1.

Optionally, the method further includes: adjusting wavelengths of the second laser and a wavelength-selective optical element to which the second laser is coupled, so that the wavelength of the wavelength-selective optical element is changed to the first wavelength.

Optionally, the method further includes: setting wavelengths of the second laser and a wavelength-selective optical element to which the second laser is coupled to be different from the wavelengths of the N lasers and different from the second wavelength. Optionally, before the switching a first laser in the N lasers to a second idle laser in the M lasers, the method further includes: confirming that the first laser in the N lasers is faulty, and shutting down the first laser.

Specifically, there are multiple manners for adjusting the wavelength of the wavelength-selective optical element to which the first laser is coupled. For example, when the wavelength-selective optical element is a TFF, a wavelength of the TFF is adjusted by means of rotation by an angle or by changing a temperature.

When the wavelength-selective optical element is an MRR, a wavelength of the MRR is adjusted by means of changing a temperature or injecting a current. In an actual application, multiple other implementation manners are also available, and details are not described herein again.

Embodiment 9

Figure 10:
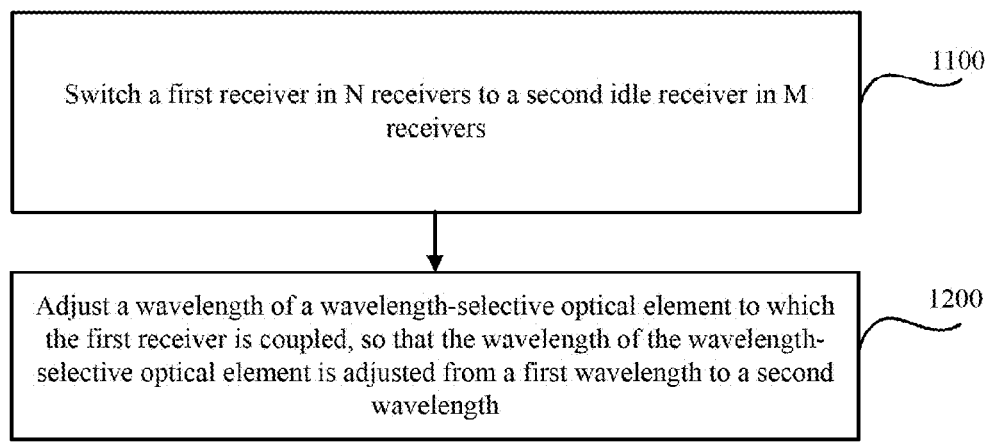
FIG. 10 is a detailed procedure of receiving light by an optical receiver according to an embodiment of the present invention.

As shown in FIG. 10, this embodiment of the present invention provides a method for receiving light by an optical receiver. The optical receiver is the optical receiver described in Embodiment 3 or Embodiment 4. The optical receiver includes M output ends of M wavelength-selective optical elements to which M optical receivers are coupled; the M optical receivers correspond to the M wavelength-selective optical elements in a one-to-one manner; a wavelength of each wavelength-selective optical element is set to be consistent with a wavelength of a coupled optical receiver; input ends of the M wavelength-selective optical elements are demultiplexed into M input ends by means of one channel of light; the M optical receivers include N lasers that are in a working state, where N<M. The method includes:

Step 1100: Switch a first optical receiver in the N optical receivers to a second idle optical receiver in the M optical receivers.

Step 1200: Adjust a wavelength of a wavelength-selective optical element to which the first optical receiver is coupled, so that the wavelength of the wavelength-selective optical element is adjusted from a first wavelength to a second wavelength, and the second wavelength is different from the N wavelengths.

Both M and N are integers greater than or equal to 1.

Optionally, the method further includes: adjusting wavelengths of the second optical receiver and a wavelength-selective optical element to which the second optical receiver is coupled, so that the wavelength of the wavelength-selective optical element is changed to the first wavelength.

Optionally, the method further includes: setting wavelengths of the second receiver and a wavelength-selective optical element to which the second optical receiver is coupled to be different from the wavelengths of the N optical receiver and different from the second wavelength.

Optionally, before the switching a first optical receiver in the N optical receivers to a second idle optical receiver in the M optical receivers, the method further includes confirming that the first optical receiver in the N optical receivers is faulty, and shutting down the first laser.

Specifically, there are multiple manners for adjusting the wavelength of the wavelength-selective optical element to which the first laser is coupled. For example, when the wavelength-selective optical element is a TFF, a wavelength of the TFF is adjusted by means of rotation by an angle or by changing a temperature.

When the wavelength-selective optical element is an MRR, a wavelength of the MRR is adjusted by means of changing a temperature or injecting a current. In an actual application, multiple other implementation manners are also available, and details are not described herein again.

To sum up, according to the optical transmitter or optical receiver provided in the embodiments of the present invention, when a working laser is faulty, an idle laser is set to emit light of a same wavelength as the faulty laser, and a wavelength of an optical element coupled with the faulty laser is adjusted, so that the wavelength of the optical element is different from a wavelength of light emitted by the original working laser, so that the optical element performs total reflection on the light emitted by the original working laser.

According to the foregoing technical solutions, problems of an excessive large power loss and relatively low output optical power efficiency in the prior art are resolved.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a function in one or more processes in the flowcharts and/or in one or more blocks in the block diagrams.

Although the foregoing embodiments of the present invention have been described, persons skilled in the art can make changes and modifications to these embodiments once they learn the basic inventive concept. Therefore, the following claims are intended to be construed as to cover the foregoing embodiments and all changes and modifications falling within the scope of the present invention.

Obviously, persons skilled in the art can make various modifications and variations to the embodiments of the present invention without departing from the scope of the embodiments of the present invention. The present invention is intended to cover these modifications and variations provided that they fall within the scope of protection defined by the following claims and their equivalent technologies.

What is claimed is:

1. An optical transmitter comprising:
   M lasers and M wavelength-selective optical elements, wherein the M lasers are coupled to M input ends of the M wavelength-selective optical elements, wherein the M lasers correspond to the M wavelength-selective optical elements in a one-to-one manner, and a wavelength of each wavelength-selective optical element is set to be consistent with a wavelength of a coupled laser;
   wherein M output ends of the M wavelength-selective optical elements are coupled as one channel;
   wherein the M lasers comprise N lasers that are in a working state, wherein M is a total number of lasers, N is a number of lasers in the working state, N and M are integers greater than or equal to 1, and wherein N is less than M;
   wherein the N lasers correspond to N different wavelengths; and
   wherein, when a first laser in the N lasers is switched to an idle state in the M lasers, a wavelength of a wavelength-selective optical element to which the first laser is coupled is adjusted from a first wavelength to a second wavelength, and the second wavelength is different from the wavelengths of the N lasers.

2. The optical transmitter according to claim 1, wherein wavelengths of a second laser and a wavelength-selective optical element to which the second laser is coupled are set as the first wavelength; or wavelengths of the second laser and a wavelength-selective optical element to which the second laser is coupled are set to be different from the wavelengths of the N lasers and different from the second wavelength.

3. The optical transmitter according to claim 1, wherein each of the M wavelength-selective optical elements is a thin film filter, and the thin film filters are coupled as one channel by using a reflector.

4. The optical transmitter according to claim 1, wherein each of the M wavelength-selective elements is a microring resonator, and the microring resonators are coupled as one channel by using an optical waveguide.

5. The optical transmitter according to claim 1, wherein the optical transmitter further comprises:
   control logic configured to control the first laser in the N lasers to switch to the idle state in the M lasers.

6. An optical receiver comprising:
   M optical receivers and M wavelength-selective optical elements, wherein the M optical receivers are coupled to M output ends of the M wavelength-selective optical elements, wherein the M optical receivers correspond to the M wavelength-selective optical elements in a one-to-one manner, and a wavelength of each wavelength-selective optical element is set to be consistent with a wavelength of a coupled optical receiver;
   wherein input ends of the M wavelength-selective optical elements demultiplex a channel of light into M output ends;
   wherein the M optical receivers comprise N optical receivers that are in a working state, wherein N is a number of optical receivers in the working state, M is a total number of optical receivers, N and M are integers greater than or equal to 1, and wherein N is less than M;
   wherein the N optical receivers correspond to N different wavelengths; and
   when a first optical receiver in the N optical receivers is switched to a idle state in the M optical receivers, a wavelength of a wavelength-selective optical element to which the first optical receiver is coupled is adjusted from a first wavelength to a second wavelength, and the second wavelength is different from the wavelengths of the N optical receivers.

7. The optical receiver according to claim 6, wherein wavelengths of a second optical receiver and a wavelength-selective optical element to which the second optical receiver is coupled are set as the first wavelength; or wavelengths of the second optical receiver and a wavelength-selective optical element to which the second optical receiver is coupled are set to be different from the wavelengths of the N optical receivers and different from the second wavelength.

8. The optical receiver according to claim 6, wherein each of the M wavelength-selective elements is a thin film filter, and the thin film filters demultiplex one channel of light into M input ends by using a reflector.

9. The optical receiver according to claim 6, wherein each of the M wavelength-selective elements is a microring resonator, and the microring resonators demultiplex one channel of light into M input ends by using an optical waveguide.

10. The optical receiver according to claim 6, wherein the optical receiver further comprises:
    control logic configured to control the first optical receiver in the N optical receivers to switch to a second idle optical receiver in the M optical receivers.

11. A passive optical network (PON) system, comprising an optical line terminal (OLT), and at least one optical network unit (ONU) or optical network terminal (ONT), wherein the OLT is connected to the at least one ONU or ONT by using an optical distribution network (ODN), and the OLT or the ONU is a optical network device; wherein the optical network device comprises an optical transmitter and an optical receiver;
    wherein the optical transmitter comprises:
      M lasers and M wavelength-selective optical elements, wherein the M lasers are coupled to M input ends of the M wavelength-selective optical elements, the M lasers correspond to the M wavelength-selective optical elements in a one-to-one manner, and a wavelength of each wavelength-selective optical element is set to be consistent with a wavelength of a coupled laser;
      wherein M output ends of the M wavelength-selective optical elements are coupled as one channel;
      wherein the M lasers comprise N lasers that are in a working state, wherein N is a number of lasers in the working state, M is a total number of lasers, M and N are integers greater than or equal to 1, and wherein N is less than M;
      wherein the N lasers correspond to N different wavelengths; and wherein, when a first laser in the N lasers is switched to a idle state in the M lasers, a wavelength of a wavelength-selective optical element to which the first laser is coupled is adjusted from a first wavelength to a second wavelength, and the second wavelength is different from the wavelengths of the N lasers; or wherein the optical receiver comprises:

P optical receivers and P wavelength-selective optical elements, wherein the P optical receivers are coupled to P output ends of the P wavelength-selective optical elements, wherein the P optical receivers correspond to the P wavelength-selective optical elements in a one-to-one manner, and a wavelength of each wavelength-selective optical element is set to be consistent with a wavelength of a coupled optical receiver;

wherein input ends of the P wavelength-selective optical elements demultiplex a channel of light into P output ends;

wherein the P optical receivers comprise Q optical receivers that are in a working state, wherein Q is a number of optical receivers in the working state, P is a total number of optical receivers, P and Q are integers greater than or equal to 1, and wherein Q is less than P;

wherein the Q optical receivers correspond to Q different wavelengths; and wherein, when a first optical receiver in the Q optical receivers is switched to a idle state in the P optical receivers, a wavelength of a wavelength-selective optical element to which the first optical receiver is coupled is adjusted from a first wavelength to a second wavelength, and the second wavelength is different from the wavelengths of the Q optical receivers.

12. A method for emitting light by an optical transmitter, applied to an optical transmitter comprising M lasers and M wavelength-selective optical elements, wherein the M lasers are coupled to M input ends of the M wavelength-selective optical elements, the M lasers correspond to the M wavelength-selective optical elements in a one-to-one manner, a wavelength of each wavelength-selective optical element is consistent with a wavelength of a coupled laser, M output ends of the M wavelength-selective optical elements are coupled as one channel, the M lasers comprise N lasers that are in a working state, wherein N is a number of lasers in the working state, M is a total number of lasers, M and N are integers greater than or equal to 1, and wherein N is less than M; and the method comprises:

switching a first laser in the N lasers to a second idle laser in the M lasers; and adjusting a wavelength of a wavelength-selective optical element to which the first laser is coupled, so that the wavelength of the wavelength-selective optical element is adjusted from a first wavelength to a second wavelength, and the second wavelength is different from wavelengths of the N lasers.

13. The method according to claim 12, wherein the method further comprises:

adjusting wavelengths of a second laser and a wavelength-selective optical element to which the second laser is coupled, so that the wavelength of the wavelength-selective optical element is changed to the first wavelength; or setting wavelengths of the second laser and a wavelength-selective optical element to which the second laser is coupled to be different from the wavelengths of the N lasers and different from the second wavelength.

14. The method according to claim 12, wherein before the switching a first laser in the N lasers to a second idle laser in the M lasers, the method further comprises:

confirming that the first laser in the N lasers is faulty, and shutting down the first laser.

15. A method for receiving light by an optical receiver, applied to an optical receiver comprising M optical receivers and M wavelength-selective optical elements, wherein the M optical receivers are coupled to M output ends of the M wavelength-selective optical elements, the M optical receivers correspond to the M wavelength-selective optical elements in a one-to-one manner, a wavelength of each wavelength-selective optical element is set to be consistent with a wavelength of a coupled optical receiver, input ends of the M wavelength-selective optical elements are demultiplexed into M input ends using one channel of light, the M optical receivers comprise N optical receivers that are in a working state, wherein N is a number of optical receivers in the working state, and M is a total number of optical receivers, N and M are integers greater than or equal to 1, and wherein N is less than M; and the method comprises:

switching a first optical receiver in the N optical receivers to a idle state in the M optical receivers; and adjusting a wavelength of a wavelength-selective optical element to which the first optical receiver is coupled, so that the wavelength of the wavelength-selective optical element is adjusted from a first wavelength to a second wavelength, and the second wavelength is different from wavelengths of the N optical receivers.

16. The method according to claim 15, wherein the method further comprises:

adjusting wavelengths of a second optical receiver and a wavelength-selective optical element to which the second optical receiver is coupled, so that the wavelength of the wavelength-selective optical element is changed to the first wavelength; or setting wavelengths of the second optical receiver and a wavelength-selective optical element to which the second optical receiver is coupled to be different from the wavelengths of the N optical receivers and different from the second wavelength.

17. The method according to claim 15, wherein before the switching a first optical receiver in the N optical receivers to a second idle optical receiver in the M optical receivers, the method further comprises:

confirming that the first optical receiver in the N optical receivers is faulty, and shutting down the first optical receiver.

* * * * *